US011225418B2

(12) United States Patent
Chen et al.

(10) Patent No.: US 11,225,418 B2
(45) Date of Patent: Jan. 18, 2022

(54) METHOD OF PREPARING CARBON-GRAPHENE-LEAD COMPOSITE PARTICLES

(71) Applicant: CWZE Power Inc., Vancouver (CA)

(72) Inventors: Zhongwei Chen, Waterloo (CA); Zhiyu Mao, Waterloo (CA)

(73) Assignee: CWZE Power Inc., Vancouver (CA)

(*) Notice: Subject to any disclaimer, the term of this patent is extended or adjusted under 35 U.S.C. 154(b) by 113 days.

(21) Appl. No.: 16/650,958

(22) PCT Filed: Oct. 2, 2018

(86) PCT No.: PCT/CA2018/051243
§ 371 (c)(1),
(2) Date: Mar. 26, 2020

(87) PCT Pub. No.: WO2019/068186
PCT Pub. Date: Apr. 11, 2019

(65) Prior Publication Data
US 2020/0262713 A1    Aug. 20, 2020

Related U.S. Application Data

(60) Provisional application No. 62/606,602, filed on Oct. 2, 2017.

(51) Int. Cl.
*C01G 21/00* (2006.01)
*C01B 32/05* (2017.01)
(Continued)

(52) U.S. Cl.
CPC ............ *C01G 21/006* (2013.01); *C01B 32/05* (2017.08); *C01B 32/194* (2017.08);
(Continued)

(58) Field of Classification Search
CPC ..... C01G 21/006; C01B 32/05; C01B 32/194; C01P 2004/45; C01P 2004/61; C08L 1/02;
(Continued)

(56) References Cited

U.S. PATENT DOCUMENTS

| 2014/0329142 | A1 | 11/2014 | Dickinson |
| 2018/0261831 | A1 | 9/2018 | Elshina |
| 2018/0301696 | A1 | 10/2018 | Barker |

FOREIGN PATENT DOCUMENTS

| CN | 102881866 A | 1/2013 |
| CN | 102201575 B | 4/2013 |

(Continued)

OTHER PUBLICATIONS

Yolshina, et al., Novel lead-graphene and lead-graphite metallic composite materials for possible applications as positive electrode grid in lead-acid battery, Journal of Power Sources 2015; 278: 87-97 (Year: 2015).*

(Continued)

*Primary Examiner* — Daniel C. McCracken
(74) *Attorney, Agent, or Firm* — Smith, Gambrell & Russell LLP

(57) ABSTRACT

Provided herein is a method of preparing carbon-graphene-lead composite particles, comprising the steps of forming a dispersion of lead particles, graphene particles and cellulose in an aqueous solution, spray drying the dispersion to aggregate the lead particles, graphene particles and cellulose to form cellulose-graphene-lead composite particles, and heating the cellulose-graphene-lead composite particles, to carbonize the cellulose to result in the formation of the carbon-graphene-lead composite particles.

12 Claims, 2 Drawing Sheets

(51) Int. Cl.
*C01B 32/194* (2017.01)
*C08L 1/02* (2006.01)

(52) U.S. Cl.
CPC ...... *C01P 2004/45* (2013.01); *C01P 2004/61* (2013.01); *C08L 1/02* (2013.01)

(58) Field of Classification Search
CPC ......... Y02E 60/10; H01M 4/20; H01M 4/366; H01M 4/625; H01M 4/38; H01M 10/06; H01M 4/16
See application file for complete search history.

(56) References Cited

FOREIGN PATENT DOCUMENTS

| | | |
|---|---|---|
| CN | 102244300 B | 4/2014 |
| CN | 103956484 A | 7/2014 |
| CN | 104638248 A | 5/2015 |
| CN | 106410160 A | 2/2017 |
| CN | 106654217 A | 5/2017 |

OTHER PUBLICATIONS

International Preliminary Report on Patentability dated Apr. 8, 2020, issued in PCT/CA2018/051243.

\* cited by examiner

METHOD OF PREPARING CARBON-GRAPHENE-LEAD COMPOSITE PARTICLES

CROSS REFERENCE TO RELATED APPLICATIONS

This application is a national stage application, filed under 35 U.S.C. § 371, of International Patent Application No. PCT/CA2018/051243 filed on Oct. 2, 2018, which claims benefit of and priority to U.S. Provisional Application No. 62/606,602 filed on Oct. 2, 2017.

TECHNICAL FIELD

The present description relates to a method of preparing carbon-graphene-lead composite particles, the particles are particularly suitable for use as negative active materials in a lead-acid battery.

BACKGROUND OF THE INVENTION

Lead-acid batteries have been important for energy storage for more than 100 years due to their low self-discharge, maintenance-free operation and low cost, mature production technology. Due to significant growth in the automotive, motorcycle, standby power, and smart-power grid industries, lead-acid batteries are expected to continue to dominate the market for the next few decades.

However, it is well-known that sulfation prevents sustained performance of traditional lead-acid batteries. Sulfation is a buildup of lead sulfate on the positive and negative plates of lead acid batteries during normal discharge and self-discharge. The lead sulfate crystals adhere to the plates during discharge, and dissolve again during charging. Although both plates experience sulfation, the positive plate supports a high charge rate, while the negative plate does not.

Therefore, new lead-acid systems are being developed to solve this problem by adding carbon to the negative plate. This turns the battery into a quasi-asymmetric supercapacitor and improves charge and discharge performance. Lead-acid batteries with carbon added to the negative plate are often called lead-carbon batteries.

A number of attempts have been made to improve the performance of so-called lead-carbon batteries, some of which are discussed in the patents below:

CN Patent No. 102244300 B discloses the use of directly added graphene as an additive to improve charge-discharge performance.

CN Patent Application No. 102881866 A discloses a lead-carbon battery negative plate containing lead and graphene composite materials to improve the mixing uniformity of the lead powder and graphene materials.

CN Patent No. 102201575 B discloses a lead sulfate-graphene composite electrode material to improve the cycle life of a lead-acid battery.

US Patent Application No. US20140329142 A1 discloses a current collector shielding with ported packets applied to lead-carbon.

As discussed above, some manufacturers of lead-carbon batteries have adopted a step of adding small amounts of graphene to the negative plates. However, difficulties exist in achieving a uniform mixture of the lead powder and graphene materials, which can limit the effectiveness of the mixture. There exists a need for an improved method of manufacturing negative active materials in lead-carbon batteries.

SUMMARY OF THE INVENTION

In one aspect, provided herein is a method of preparing carbon-graphene-lead composite particles, comprising the steps of:
1) dispersing lead particles, graphene and cellulose materials in aqueous solution;
2) spray drying the dispersion to aggregate the lead particles, graphene particles and cellulose to form cellulose-graphene-lead composite particles; and
3) carbonizing the cellulose-graphene-lead composite particles to form the carbon-graphene-lead composite particles.

DETAILED DESCRIPTION OF THE INVENTION

Provided herein is a method of preparing carbon-graphene-lead composite particles, comprising the steps of:
1) dispersing lead particles, graphene particles and cellulose in an aqueous solution;
2) spray drying the dispersion leading to the aggregation of the lead particles along with the graphene particles and cellulose to form the cellulose-graphene-lead composite particles; and
3) carbonizing the cellulose-graphene-lead composite particles at a high temperature under inert gas at atmospheric pressure to form the carbon-graphene-lead composite particles.

The term "lead particles" may include lead nanoparticles and microparticles.

The term "graphene particles" may include graphene microparticles, nanoparticles and nanowire.

The terms "cellulose" or "cellulose material" may include cellulose microfibrils, nanofibrils, fibrils, nanotubes, nanowire and powder.

The term "about" means plus or minus 10%.

The term "C rate" refers to the charging or discharging rate of a cell or battery, expressed in terms of its total storage capacity in Ah or mAh. For example, a rate of 1 C means discharge of all of the stored energy in one hour; a 0.1 C means discharge of 10% of the energy in one hour or full energy in 10 hours; and a 5 C means discharge of full energy in 12 minutes.

In one embodiment, lead particles, graphene particles and cellulose materials are dispersed in water, or preferably in de-ionized water to form an aqueous solution. The viscosity of the mixture can be adjusted by varying the amount of water. The lead particles have a size of about 1 μm to about 5 μm, the graphene particles have a size of about 300 nm to about 800 nm and the cellulose materials have a length of about 0.2 μm to about 10 μm.

Figure 1:
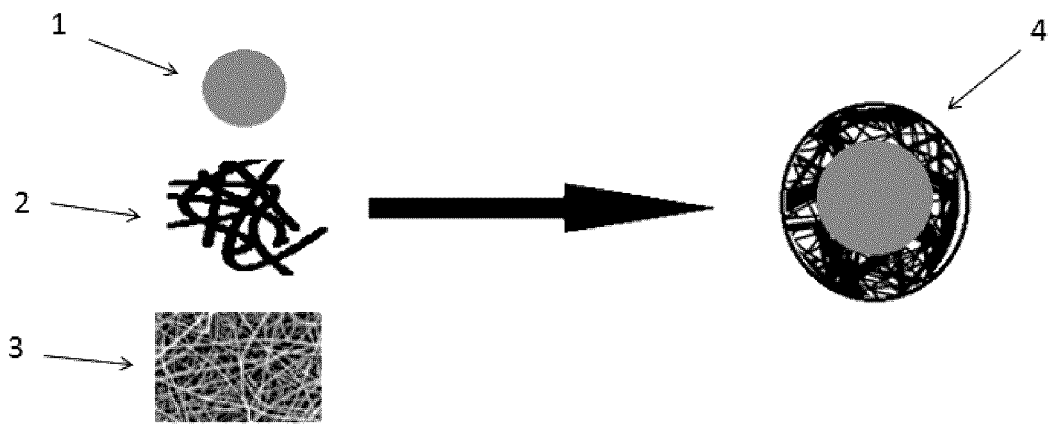
FIG. 1 depicts a schematic of carbon-graphene-lead composite particle structure.

Without being held to any theory, it is believed that spray draying an aqueous solution having low viscosity containing lead powder, graphene particles and cellulose, results in a better particle uniformity after spray drying. Uniformity is intended to mean uniformity of particle size distribution and/or composition. Cellulose-graphene-lead composite particles resulting from spray drying are then carbonized to form carbon-graphene-lead composite particles. FIG. 1 illustrates a lead particle 1, graphene particles 2, and cellulose fibers 3 and the cellulose-graphene-lead composite particle 4.

In another embodiment, the weight ratios of lead to cellulose, graphene to cellulose, and graphene to lead are each independently from about 1:1 to about 1:10. The aforementioned materials are dispersed in an aqueous solution, having a total solids concentration of about 0.2 g/100 ml to about 2 g/100 ml. The dispersion is spray dried using air with a flow rate of about 400 L/h to about 600 L/h to result in cellulose-graphene-lead composite particles. The dried powder is then subjected to a carbonization process to result in the carbon-graphene-lead composite particles.

Figure 2:
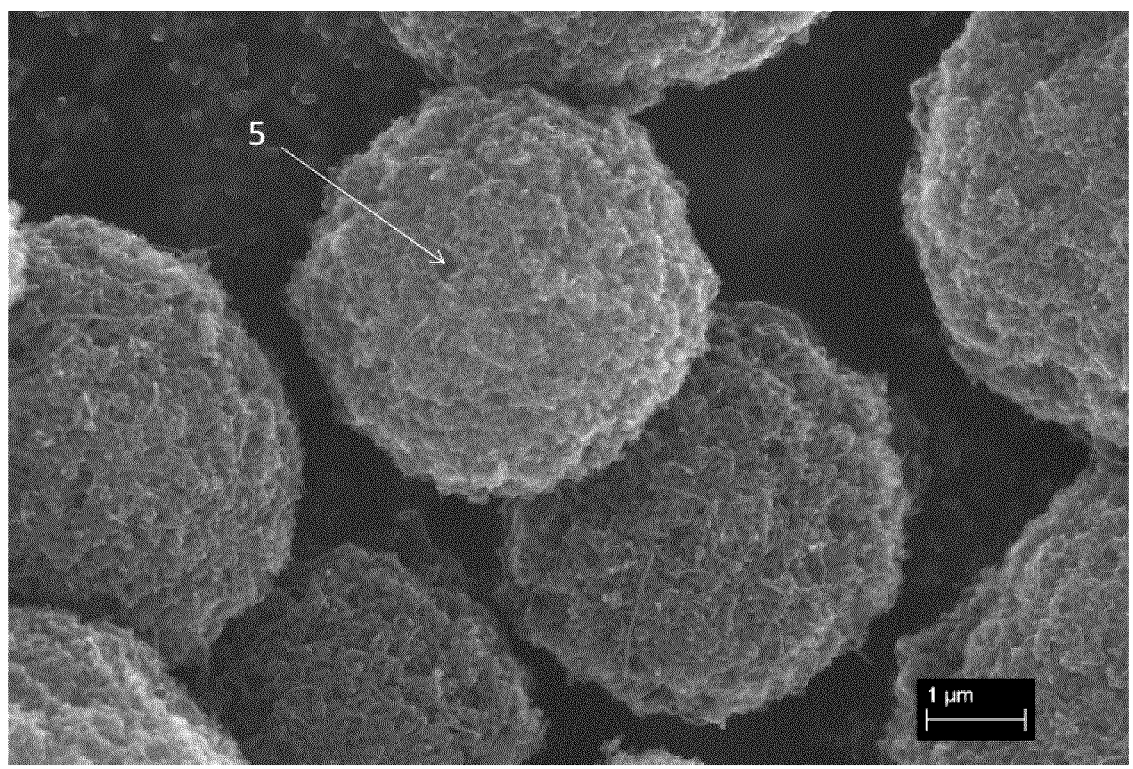
FIG. 2 depicts an electron micrograph image of a carbon-graphene-lead composite particle prepared according to the method herein.

Carbonization refers to the conversion of an organic substance into carbon or a carbon-containing residue. Carbonization of the cellulose-graphene-lead composite particles results in the formation of a porous structure in the resulting carbon-graphene-lead composite particles. FIG. 2 illustrates the structure of a carbon-graphene-lead composite particle manufactured using the process of Example A, and one of the pores is shown by reference character 5. A porous carbon fiber structure has been proven to effectively inhibit sulfation on the surface of a negative electrode and improve high current charge-discharge performance as electrolytes can permeate through the pores, increasing the rate of mass transfer. Use of the carbon-graphene-lead composite particles discussed herein in negative active materials of lead-carbon batteries increases battery performance and cycle life.

In one aspect, carbonization occurs when the cellulose-graphene-lead composite particles are heated up to a target temperature of about 400° C. to about 900° C. in about 1 to about 5 hours and held at the target temperature for about 0.1 to about 4 hours to carbonize the cellulose in the dried powder to form the carbon-graphene-lead composite particles.

EXAMPLES

Example A

Commercial lead microparticles with a size range of 1-5 μm (Camel Group, China), 300-800 nm graphene particles (Newtech Power Inc., Canada), and 10 wt. % cellulose fibril suspensions in water (J. Rettenmaier & Sohne GMBH+Co KG, Germany) are used for the carbon-graphene-lead composite particle preparation. First, 0.5 g lead particles, 0.5 g graphene particles and 5 g cellulose fibril suspensions in water are mixed by magnetic stirring for 3 hours. After that, the mixture is dispersed in 400 ml of de-ionized water under alternating magnetic stirring and ultrasonication 3 to 4 times for 3 hours each. The dispersion is then spray dried using air having a flow rate of 450 L/h to result in cellulose-graphene-lead composite particles.

The dried powder is placed into a quartz tube in a horizontal tube furnace. Then, it is heated up to 500° C. over 2 hours and heated for 30 minutes at 500° C. to carbonize the cellulose fibers in the powder mixture. After that, the furnace is cooled down to room temperature over about 2 hours, and the carbon-graphene-lead composite particles are obtained. All treatment in the quartz tube is carried out under argon gas flow of 70 SCCM.

Next, in a 1 L beaker, the carbon-graphene-lead composite particles are mixed with $BaSO_4$, humic acid, sodium lignosulfonate, de-ionized water, activated carbon using a drill with a strong stirring paddle, then water, PTFE solution, and 98% $H_2SO_4$ are added dropwise. The slurry is mixed for about 20 to about 30 minutes to form a paste. The paste density is measured to see if it is from 4.2 g/cm$^3$ to 4.7 g/cm$^3$. Three negative electrode sheets are coated with a uniform layer of paste using shovels and are weighed. The coated sheets are hung in a 95° C. humidity chamber for 48 hours. Sn—Pb metal tabs of about 10 cm in length are then welded onto both the positive and negative electrodes. After welding the tabs, the positive and negative electrodes are packed using a separator. Finally, the package is placed in a container, to which 33% $H_2SO_4$ is added as electrolyte, and electrochemical performance is investigated.

Figure 3:
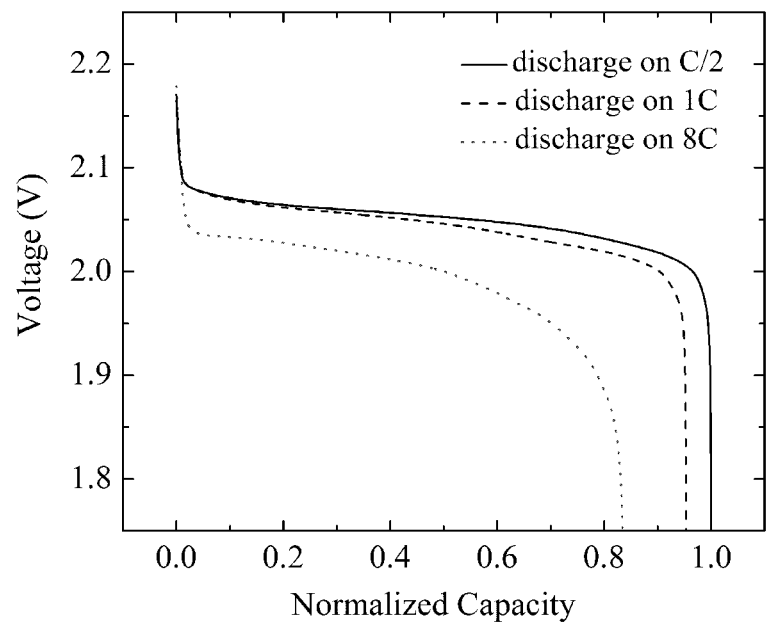
FIG. 3 depicts a graph showing the rate capability of prepared carbon-graphene-lead composite particle as lead-acid battery active material.
Figure 4:
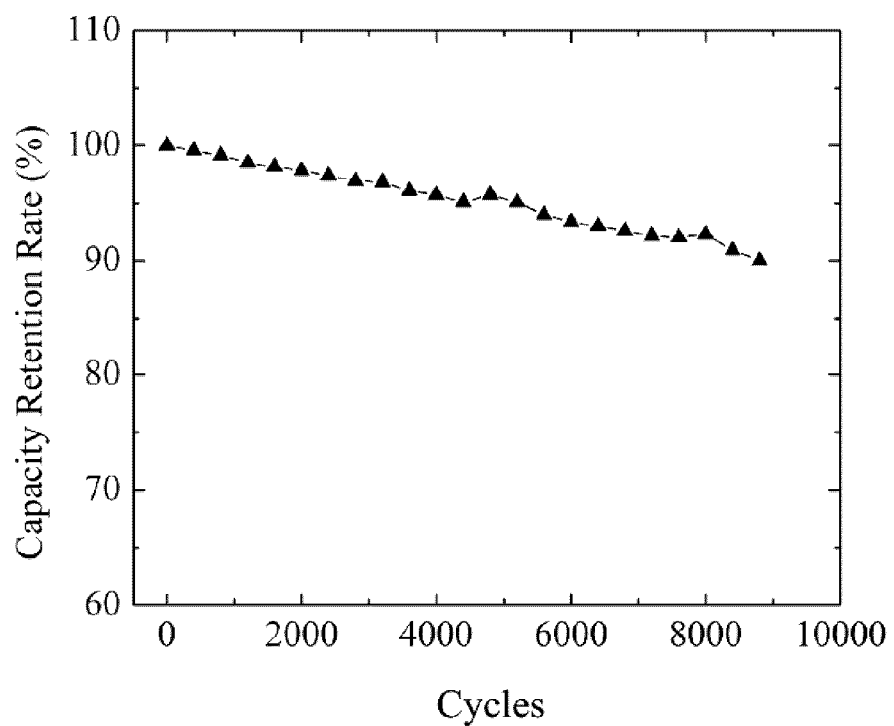
FIG. 4 depicts a graph showing the cycle life of prepared carbon-graphene-lead composite particle at a discharge rate of 1 C.

The resulting capacity and cycle tests are shown in FIGS. 3 and 4. FIG. 3 shows that the discharge capacity at the rate of 8 C can reach above 80% of the discharge capacity at C/2. FIG. 4 displays the results of a 1 C cycling life test, showing that after 9000 cycles, the battery still has 90% of its initial capacity. The results demonstrate that the use of the prepared carbon-graphene-lead composite particles as a negative active material in a lead-carbon battery results in higher battery power and longer battery life.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method of preparing carbon-graphene-lead composite particles, comprising the steps of:
    a) forming a dispersion of lead particles, graphene particles and cellulose in an aqueous solution;
    b) spray drying the dispersion to aggregate the lead particles, graphene particles and cellulose to form cellulose-graphene-lead composite particles;
    c) heating the cellulose-graphene-lead composite particles, to carbonize the cellulose to result in the formation of the carbon-graphene-lead composite particles.

2. The method of claim 1, wherein the lead particles have a particle size of about 1 μm to about 5 μm.

3. The method of claim 1, wherein the graphene particles have a particle size of about 300 nm to about 800 nm.

4. The method of claim 1, wherein the cellulose is in the form of cellulose fibers having a length of about 0.2 μm to about 10 μm.

5. The method of claim 1, wherein the carbon-graphene-lead composite particles have a size of about 1.5 μm to about 50 μm.

6. The method of claim 1, wherein the lead particles and cellulose have a weight ratio from about 1:1 to about 1:10.

7. The method of claim 1, wherein the graphene particles and cellulose have a weight ratio from about 1:1 to about 1:10.

8. The method of claim 1, wherein the graphene particles and lead particles have a weight ratio from about 1:1 to about 1:10.

9. The method of claim 1, wherein the concentration of the lead particles, graphite particles and cellulose materials in the aqueous solution is from about 0.2 g/100 ml to about 2 g/100 ml.

10. The method of claim 1, wherein the spray drying is conducted with air having a flow rate of about 400 L/h to about 600 L/h.

11. The method of claim 1, wherein the cellulose-graphene-lead composite particles are heated to a temperature of about 400° C. to about 900° C.

12. The method of claim 1, wherein the cellulose-graphene-lead particles are heated at a constant temperature for about 0.1 hours to about 4 hours.

\* \* \* \* \*